US011400013B2

(12) United States Patent
Wu

(10) Patent No.: US 11,400,013 B2
(45) Date of Patent: Aug. 2, 2022

(54) SPROCKET DRIVE MECHANISM OF MASSAGE DEVICE

(71) Applicants: Dong-Her Wu, Chang Hua Hsien (TW); IREST HEALTH SCIENCE AND TECHNOLOGY CO., LTD, Jiaxing (CN)

(72) Inventor: Dong-Her Wu, Changhua Hsien (TW)

(73) Assignee: Dong-Her Wu, Chang Hua Hsien (TW)

(*) Notice: Subject to any disclaimer, the term of this patent is extended or adjusted under 35 U.S.C. 154(b) by 346 days.

(21) Appl. No.: 16/390,038

(22) Filed: Apr. 22, 2019

(65) Prior Publication Data
US 2020/0069506 A1 Mar. 5, 2020

(30) Foreign Application Priority Data
Sep. 5, 2018 (TW) .................................. 107131395

(51) Int. Cl.
*A61H 7/00* (2006.01)
*F16H 19/06* (2006.01)
(52) U.S. Cl.
CPC ............... *A61H 7/00* (2013.01); *F16H 19/06* (2013.01); *A61H 2201/0149* (2013.01); *A61H 2201/12* (2013.01); *A61H 2201/1669* (2013.01); *F16H 2019/0668* (2013.01)
(58) Field of Classification Search
CPC .... A61H 7/00; A61H 7/007; A61H 2007/009; A61H 2201/0142; A61H 2201/0149; A61H 2201/12; A61H 2201/1215; A61H 2201/1669; F16H 19/06; F16H 19/0622; F16H 19/0636; F16H 2019/0613; F16H 2019/0668; F16H 2019/0686; F16H 7/06
See application file for complete search history.

(56) References Cited

U.S. PATENT DOCUMENTS

| 3,937,151 | A | * | 2/1976 | Monks | E21C 29/10 104/172.1 |
| 4,099,786 | A | * | 7/1978 | Nakajima | E21C 29/18 299/43 |
| 4,570,617 | A | * | 2/1986 | Baus | A61H 7/00 601/102 |
| 5,630,790 | A | * | 5/1997 | Ito | A61H 1/00 601/102 |

(Continued)

*Primary Examiner* — Colin W Stuart
*Assistant Examiner* — Douglas Y Sul
(74) *Attorney, Agent, or Firm* — Demian K. Jackson; Jackson IPG PLLC

(57) ABSTRACT

A sprocket transmission mechanism of a massage device contains: a driven box, a pair of hollow holders, and two bendable chains. The driven box is driven by two drive shafts of a motor beside the driven box. The pair of hollow holders are rotatably connected with the two drive shafts respectively and have two grooves, and the pair of hollow holders are connected inside two inner sides of a chair or a bed respectively. The two bendable chains are accommodated in the two grooves individually. The two drive shafts have four sprockets fitted on two sides thereof individually, and two driven sprockets are rotatably connected between the two sides of the two shafts respectively, such that the two bendable chains are inserted into the pair of hollow holders to mesh with and to drive the four sprockets and the two driven sprockets to rotate individually.

5 Claims, 8 Drawing Sheets

(56) References Cited

U.S. PATENT DOCUMENTS

| | | | | |
|---|---|---|---|---|
| 5,901,607 | A * | 5/1999 | Kimura | F16H 19/06 74/89.22 |
| 6,402,709 | B1 * | 6/2002 | Wu | A61H 37/00 601/101 |
| 6,409,689 | B1 * | 6/2002 | Chen | A61H 15/0078 601/103 |
| 7,052,477 | B2 * | 5/2006 | Wu | E21C 29/10 601/99 |
| 2004/0243034 | A1 * | 12/2004 | Kim | A61N 5/0625 601/100 |
| 2009/0301237 | A1 * | 12/2009 | Everman | F16H 19/06 74/37 |
| 2019/0192379 | A1 * | 6/2019 | Le | A61H 15/0078 |

\* cited by examiner

SPROCKET DRIVE MECHANISM OF MASSAGE DEVICE

FIELD OF THE INVENTION

The present invention relates to a sprocket drive mechanism of a massage device which operates accurately and durably.

BACKGROUND OF THE INVENTION

A conventional massage device is driven by a motor to massage a user. However, the conventional massage device contains at least one fixed rail/chain which moves vertically in a fixed moving path. In other words, the at least one fixed rail/chain cannot be applicable for a chair or a bed to be bendable based on using requirements.

Another conventional massage device contains a movable chain to be bendable and to massage a user matingly, but the movable chain is engaged by two sprockets tightly so as to drive massaging elements, thus damaging the movable chain.

The present invention has arisen to mitigate and/or obviate the afore-described disadvantages.

SUMMARY OF THE INVENTION

The primary aspect of the present invention is to provide a sprocket drive mechanism of a massage device which operates accurately and durably.

Another aspect of the present invention is to provide a sprocket drive mechanism of a massage device which is applicable for a chair or a bed so as to massage a user matingly based on using requirements.

To obtain the above aspect, a sprocket drive mechanism of a massage device provided the present invention contains: a driven box and a pair of hollow holders.

The driven box is driven by two drive shafts of a motor beside the driven box, and the pair of hollow holders accommodate and are rotatably connected with the two drive shafts respectively.

The pair of hollow holders have two grooves defined on the pair of hollow holders respectively and are connected inside two inner sides of a chair or a bed, and two bendable chains are accommodated in the two grooves individually.

Two inner sides of the pair of hollow holders are rotatably connected with the two drive shafts respectively, the two drive shafts have four sprockets fitted on two sides of the two drive shafts individually, and two driven sprockets are rotatably connected between the two sides of the two drive shafts respectively, such that the two bendable chains are inserted into the pair of hollow holders to mesh with and to drive the four sprockets and the two driven sprockets to rotate individually.

DETAILED DESCRIPTION OF THE PREFERRED EMBODIMENTS

Figure 1:
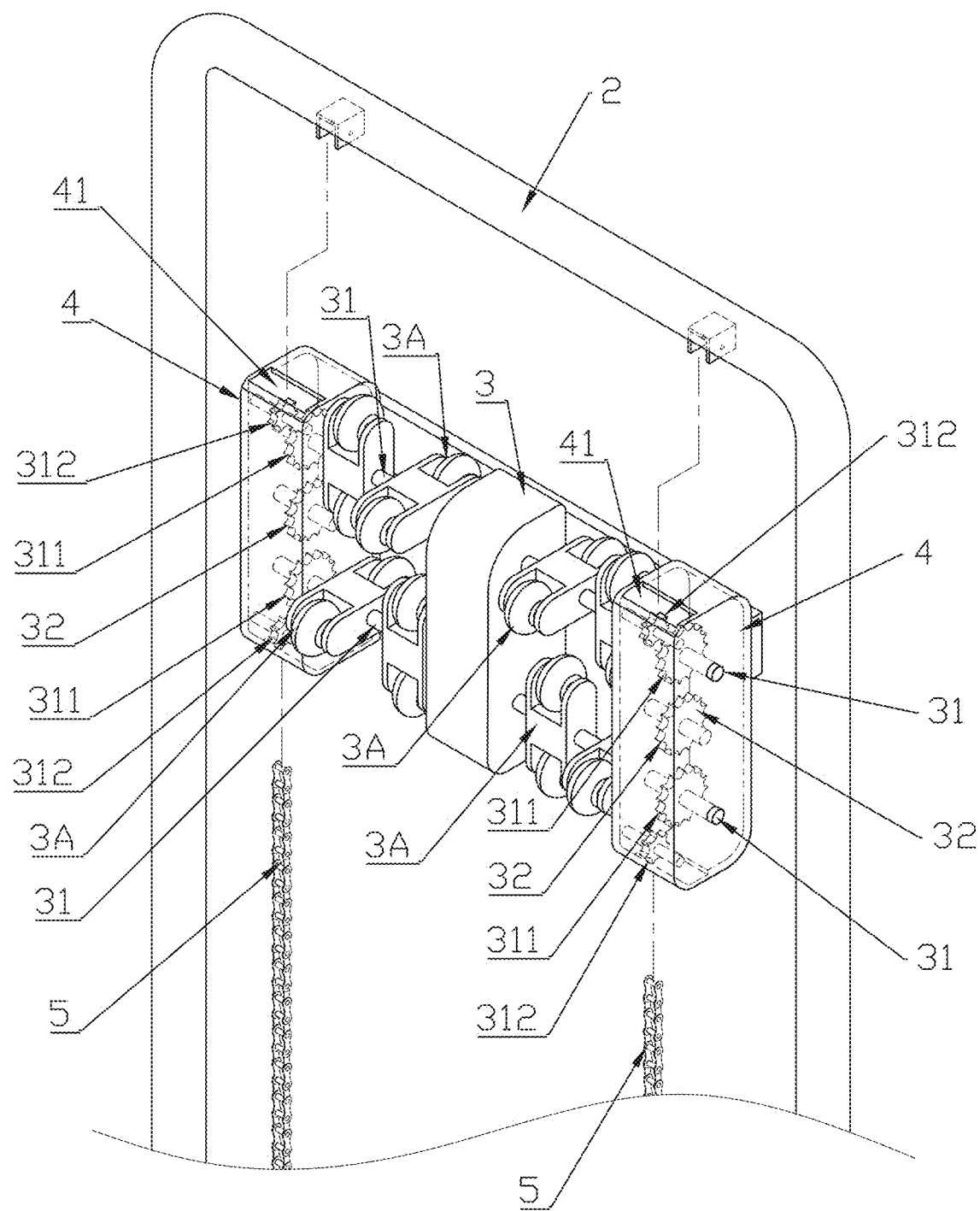
FIG. 1 is a perspective view showing the assembly of a sprocket drive mechanism of a massage device according to a first embodiment of the present invention.
Figure 2:
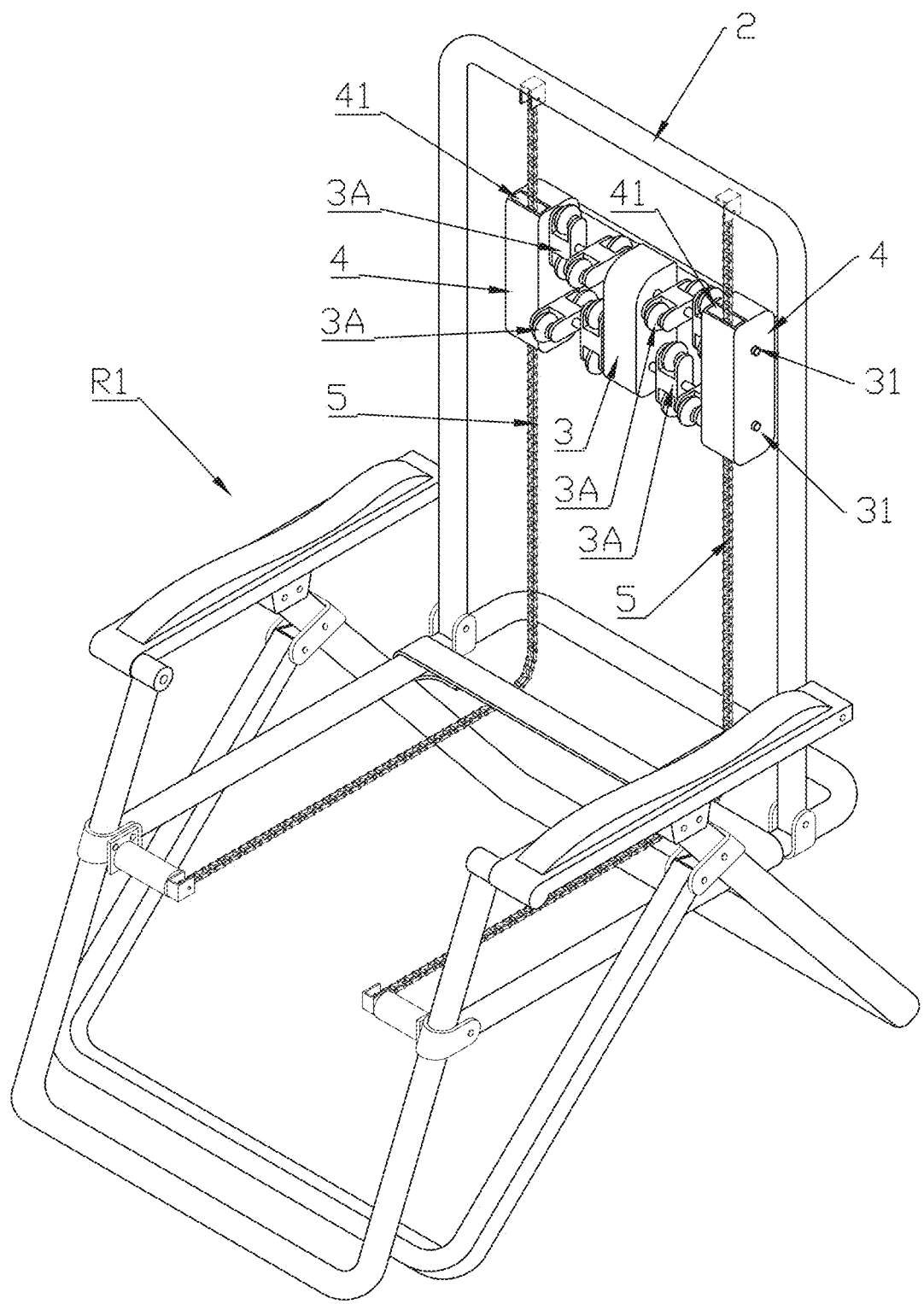
FIG. 2 is a perspective view showing the application of the sprocket drive mechanism of the massage device according to the first embodiment of the present invention.
Figure 3:
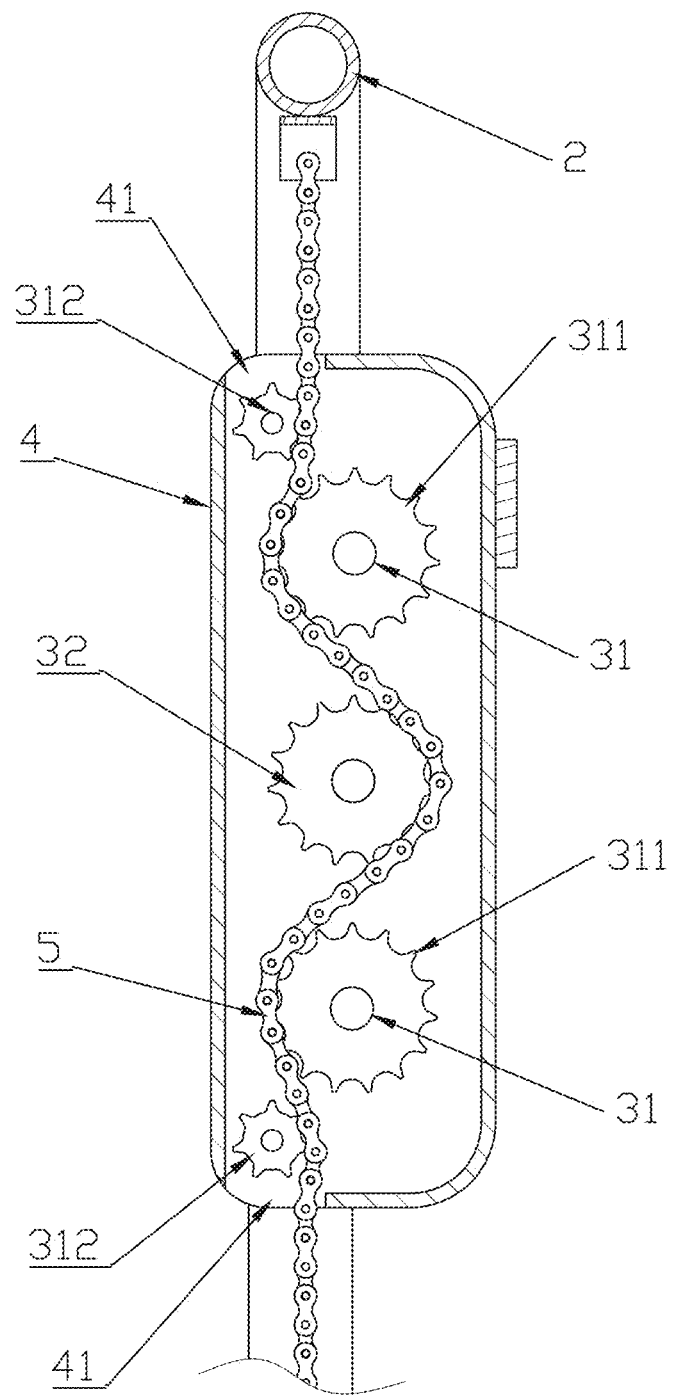
FIG. 3 is a cross sectional view showing the operation of the sprocket drive mechanism of the massage device according to the first embodiment of the present invention.

With reference to FIGS. 1-3, a sprocket transmission mechanism of a massage device according to a first embodiment of the present invention comprises: a driven box 3 driven by two drive shafts 31 of a motor (not shown) beside the driven box 3, and a pair of hollow holders 4 accommodating and rotatably connected with the two drive shafts 31 respectively, wherein the pair of hollow holders 4 have two grooves 41 defined thereon respectively and are connected inside two inner sides of a chair 2 (or a bed), and two bendable chains 5 are accommodated in the two grooves 41 individually.

Two inner sides of the pair of hollow holders 4 are rotatably connected with the two drive shafts 31 respectively, the two drive shafts 31 have four sprockets 311 fitted on two sides of the two drive shafts 31 individually, and two driven sprockets 32 are rotatably connected between the two sides of the two drive shafts 31 respectively, such that the two bendable chains 5 are inserted into the pair of hollow holders 4 to mesh with and to drive the four sprockets 311 and the two driven sprockets 32 to rotate individually.

Figure 4:
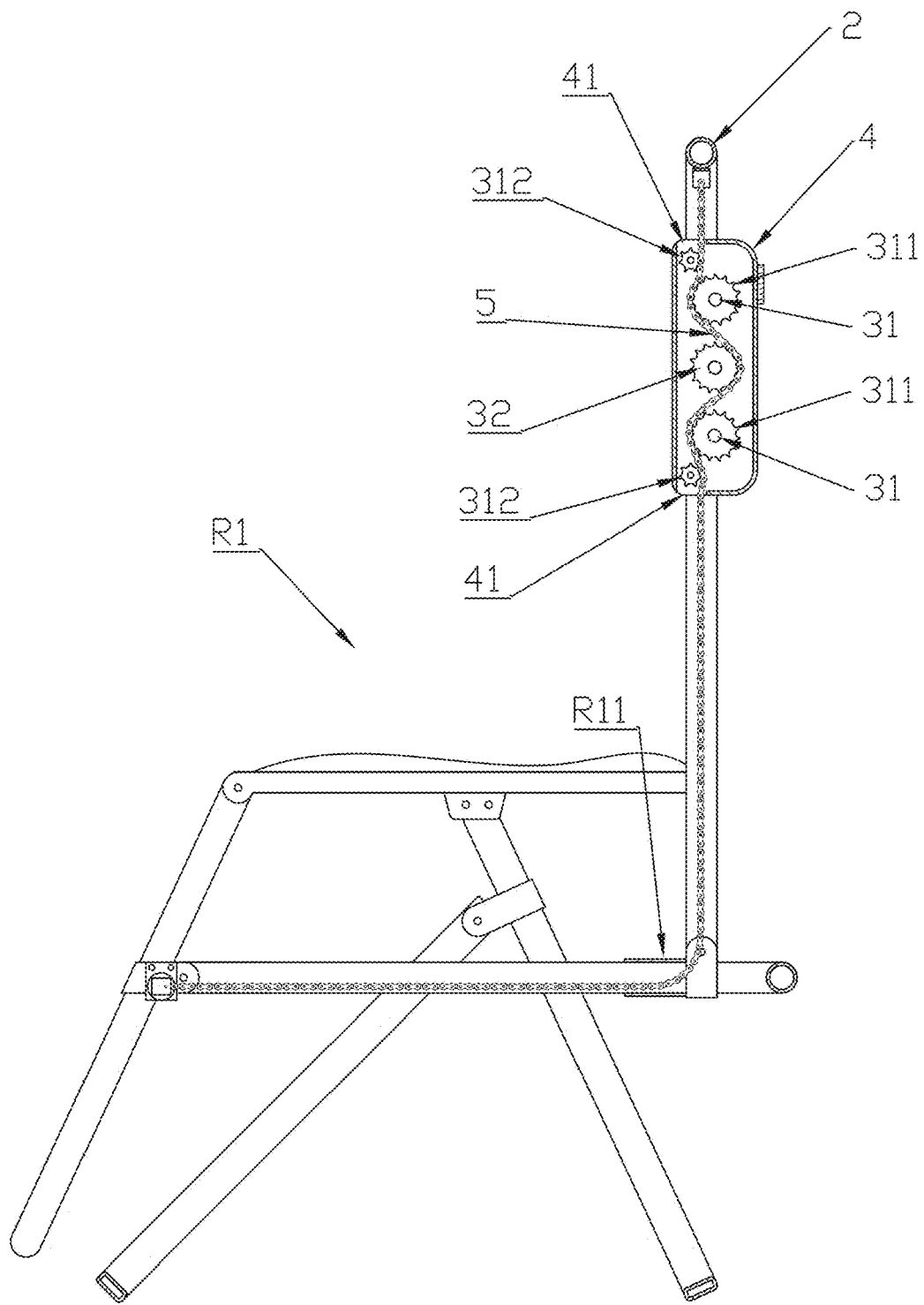
FIG. 4 is a cross sectional view showing the application of the sprocket drive mechanism of the massage device according to the first embodiment of the present invention.
Figure 5:
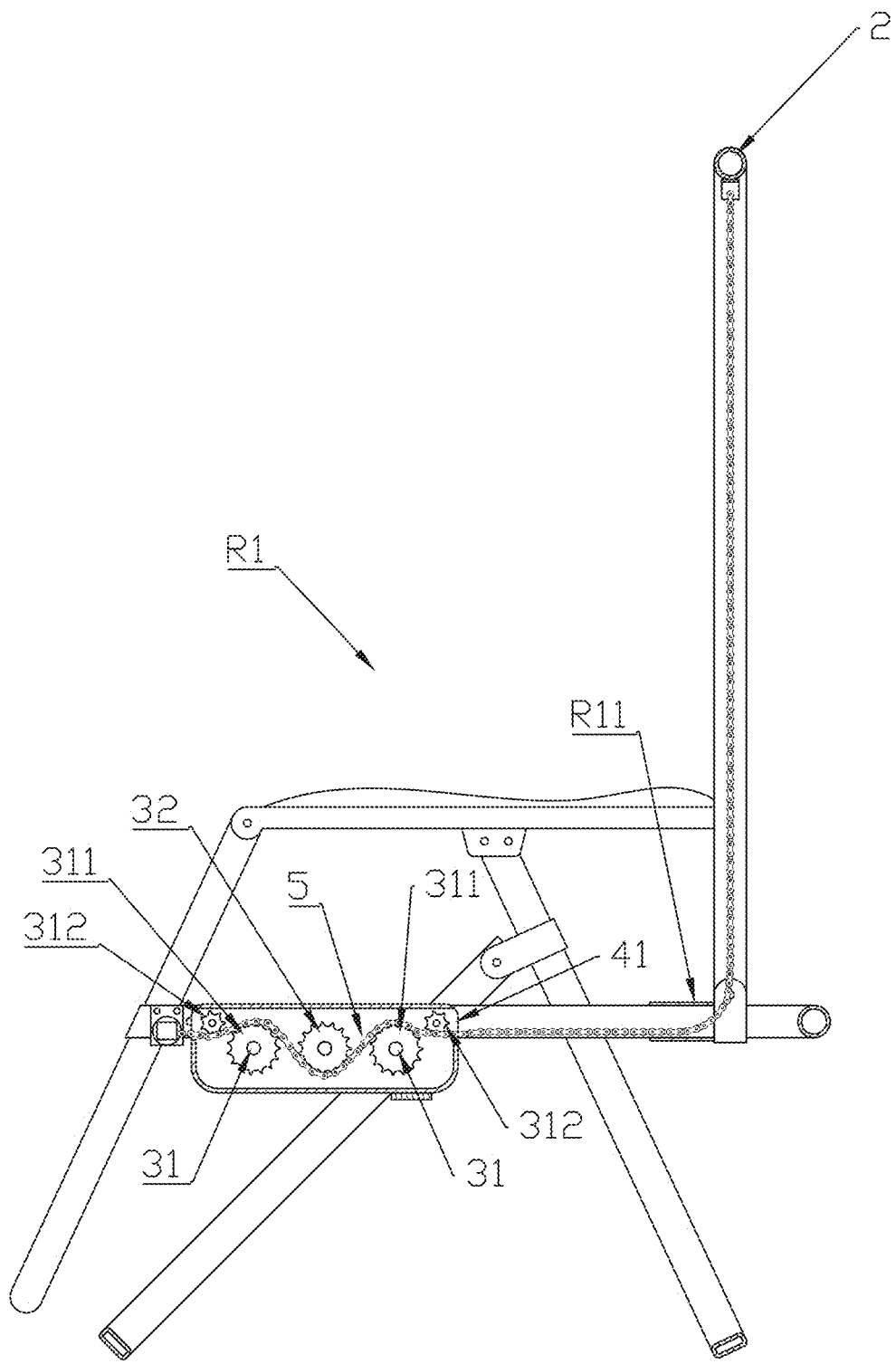
FIG. 5 is another cross sectional view showing the application of the sprocket drive mechanism of the massage device according to the first embodiment of the present invention.

Referring to FIGS. 4 and 5, the two drive shafts 31 rotate in a clockwise direction or in a counterclockwise direction so as to drive the two bendable chains 5 to rotate inside the pair of hollow holders 4 respectively via the four sprockets 311 and the two driven sprockets 32, and four kneading elements 3A are fitted on the two sides of the two drive shafts 31 inside the four sprockets 311 respectively so as to be driven by the two drive shafts 31 to rotate, thus massaging the user.

The two driven sprockets 32 are located inside and are rotatably connected with a transmission shaft inserted through the pair of hollow holders 4 so as to be driven by the transmission shaft to rotate, wherein two fitting sections are provided on two sides of the transmission shaft respectively so as to fit with two massaging rollers (not shown) among the four kneading elements 3A.

The chair 2 (or the bed) includes a protective cover (not shown) covering thereon so as to separate the user from the massage device, thus obtaining using comfort.

As shown in FIGS. 1-3, four limitation gears 312 are rotatably connected beside the four sprockets 311 respectively and are located in the pair of hollow holders 4 so as to mesh with the two bendable chains 5, thus fixing the two bendable chains 5 securely. Furthermore, the two bendable chains 5 are respectively meshed with the four sprockets 311 and the two driven sprockets 32 matingly so as to avoid a removal of the two bendable chains 5.

Figure 6:
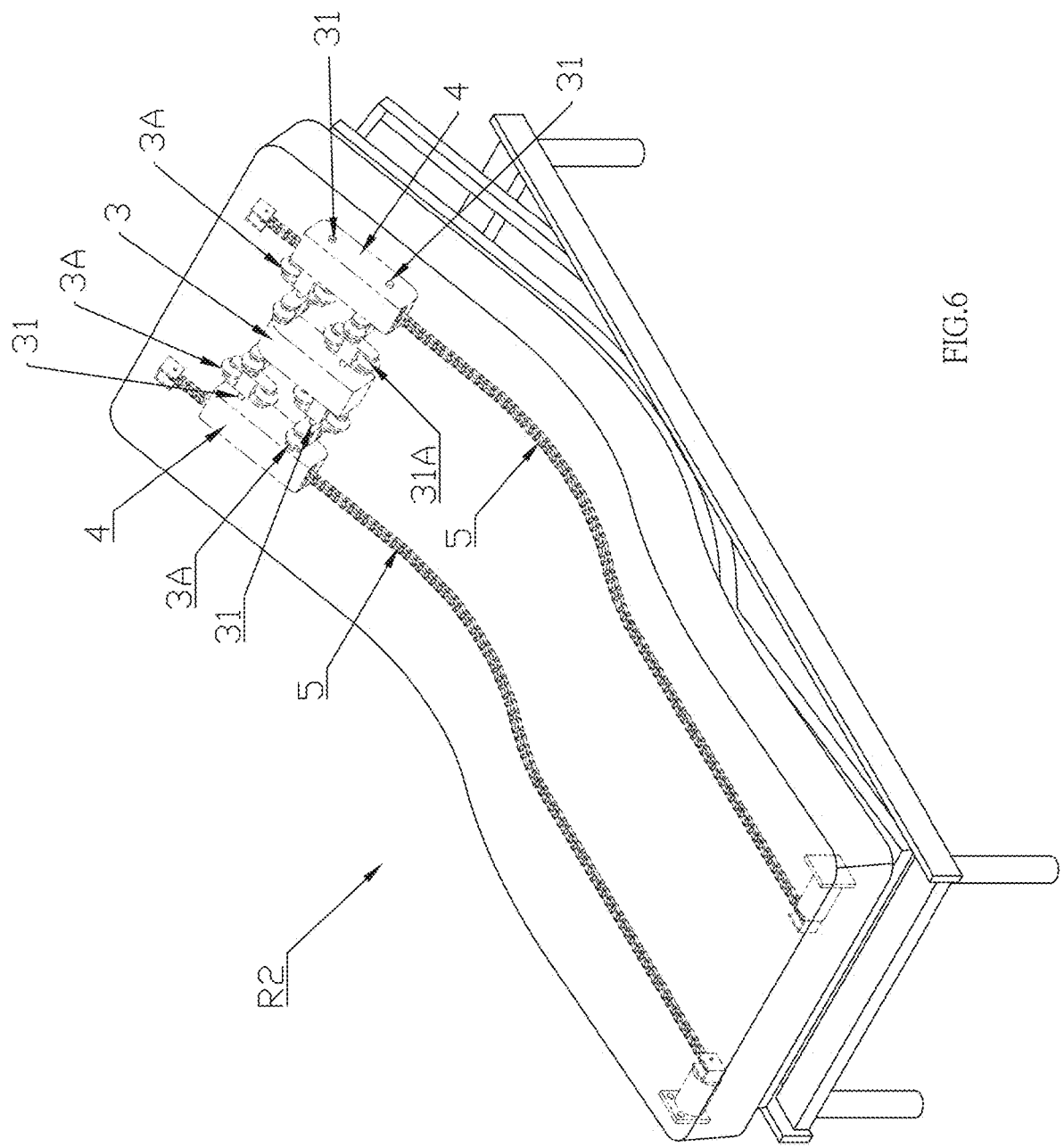
FIG. 6 is another perspective view showing the application of the sprocket drive mechanism of the massage device according to the first embodiment of the present invention.

With reference to FIGS. 4-7, the four sprockets 311, the two driven sprockets 32, and the two bendable chains 5 rotate to drive the driven box 3 to actuate rotation of the four kneading elements 3A, thus adjustably bending the chair R1 (as shown in FIGS. 2, 4 and 5) or the bed R2 (as shown in FIG. 6) and massaging the user by using the two bendable chains 5 exactly.

Referring to FIGS. 2, 4 and 5, a defining sheet R11 is horizontally fixed in a front of two middle sections of the two bendable chains 5 so as to limit a bending of the two bendable chains 5 on the chair R1 (or the bed R2).

Figure 7:
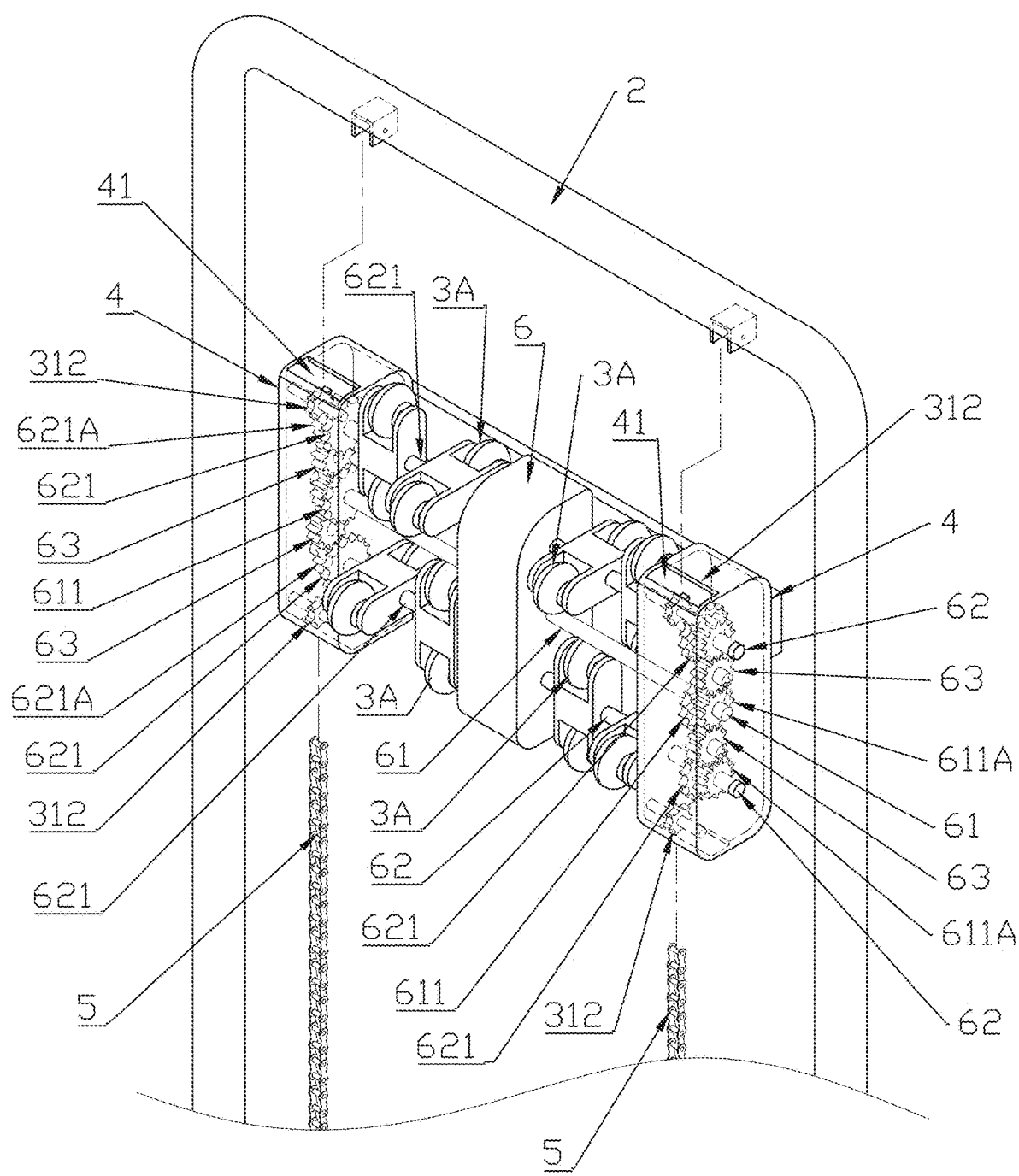
FIG. 7 is a perspective view showing the assembly of a sprocket drive mechanism of a massage device according to a second embodiment of the present invention.
Figure 8:
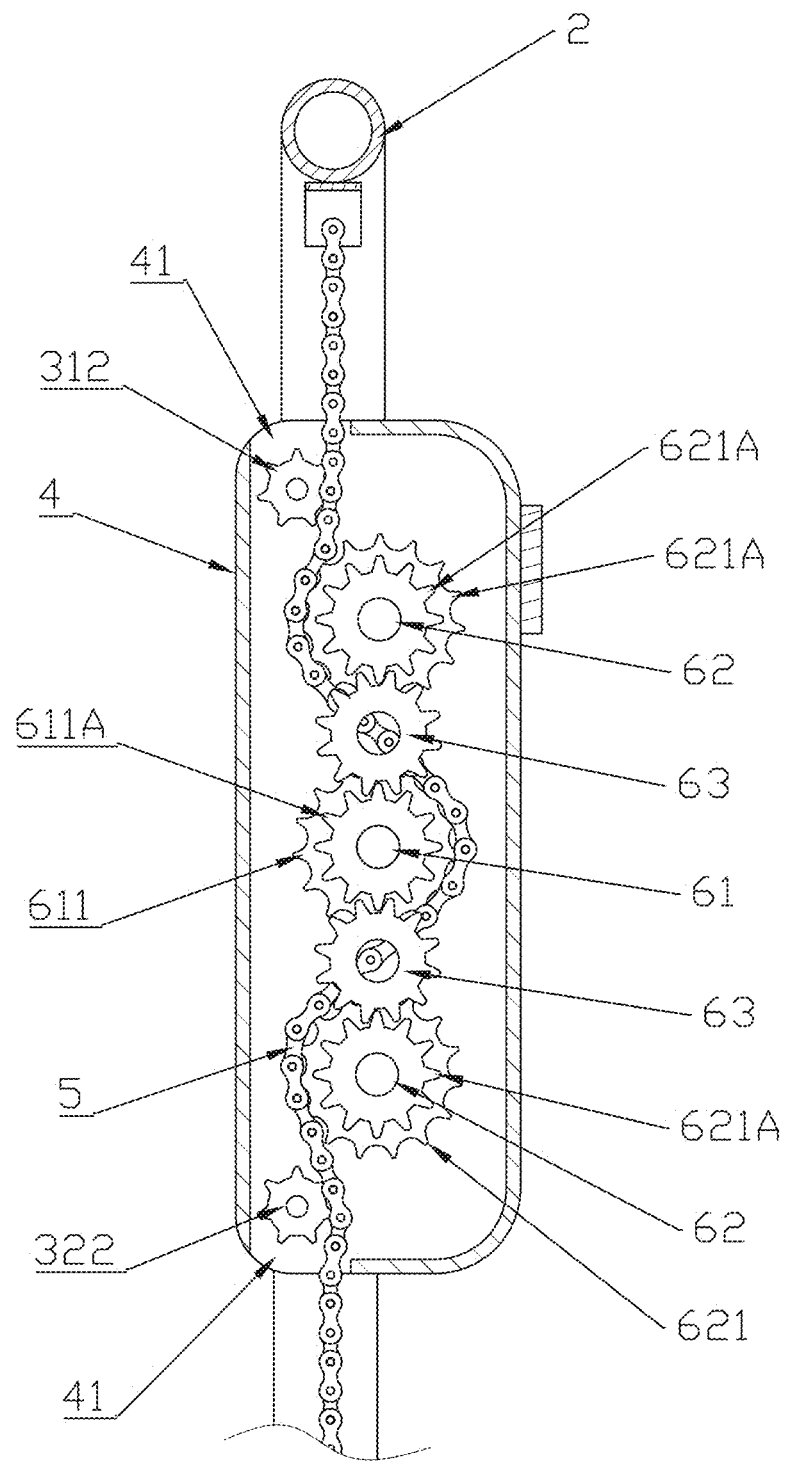
FIG. 8 is a cross sectional view showing the operation of the sprocket drive mechanism of the massage device according to the second embodiment of the present invention.

As shown in FIGS. 7 and 8, in a second embodiment, a driven box 6 is driven by a drive shaft 61 of a motor (not shown) beside the driven box 6, two driven shafts 62 are disposed above and below the drive shaft 61 respectively and are rotatably connected inside the pair of hollow holders 4, wherein two first sprockets 611 are rotatably connected on two sides of the drive shaft 61 respectively, and four second sprockets 621 are rotatably connected on four sides of the two driven shafts 62 individually so that the two bendable chains 5 are inserted through the pair of hollow holders 4 to mesh with the two first sprockets 611 and the four second sprockets 621 respectively, thus fixing the two bendable chains 5.

Two first auxiliary gears 611A are disposed beside the two first sprockets 611 individually, and four auxiliary gears 621A are mounted beside the four second sprockets 621 respectively, wherein an intermediate gear 63 is rotatably connected between any two adjacent of the two first auxiliary gear 611A and the four auxiliary gears 621A, such that the drive shaft 61 drives the two first sprockets 611 and the four second sprockets 621 to revolve, and the two first sprockets 611 and the four second sprockets 621 actuate at least one kneading element 3A on the drive shaft 61 or the two driven shafts 62 to rotate, thus massaging the user.

It is to be noted that the at least one kneading element fitted on the drive shaft 61 is not shown in FIGS. 7 and 8.

In addition, the at least one kneading element 3A is well-known art, so further remarks are omitted.

Thereby, the sprocket transmission mechanism of the massage device of the present invention operates accurately and durably.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A sprocket transmission mechanism of a massage device comprising:
    a driven box driven by two drive shafts of a motor beside the driven box,
    a pair of hollow holders accommodating and rotatably connected with the two drive shafts respectively, wherein each hollow holder has two grooves defined therein and is connected inside a respective one of two inner sides of a chair or a bed,
    two bendable chains, each accommodated in the two grooves of a respective one of the hollow holders individually; wherein two inner sides of each hollow holder is rotatably connected with the two drive shafts respectively,
    four drive sprockets, each fitted on both of two opposed sides of both of the two drive shafts individually, and
    two driven sprockets, each rotatably connected between two of the four drive sprockets at a respective one of two opposed sides of a transmission shaft and wherein each of the two bendable chains are inserted into a respective one of the pair of hollow holders to mesh with and to drive the four drive sprockets and the two driven sprockets to rotate individually.

2. The sprocket transmission mechanism as claimed in claim 1, wherein the two driven sprockets are rotatably connected with the transmission shaft inserted through the pair of hollow holders so as to be driven by the transmission shaft to rotate.

3. The sprocket transmission mechanism as claimed in claim 1, wherein four limitation gears are each rotatably connected beside a respective one of the four drive sprockets respectively and are located in the pair of hollow holders so as to mesh with the two bendable chains.

4. The sprocket transmission mechanism as claimed in claim 1, wherein a defining sheet is horizontally fixed in a front of two middle sections of the two bendable chains so as to limit a bending of the two bendable chains on the chair or the bed.

5. A sprocket transmission mechanism of a massage device comprising:
    a driven box driven by a drive shaft of a motor beside the driven box,
    a pair of hollow holders each accommodating and rotatably connected with the drive shaft, wherein each hollow holder has two grooves defined therein and is connected inside a respective one of two inner sides of a chair or a bed,
    two bendable chains, each accommodated in the two grooves of a respective one of the hollow holders individually, wherein two inner sides of each hollow holder are rotatably connected with the drive shaft respectively,
    two driven shafts disposed above and below the drive shaft respectively and rotatably connected inside the pair of hollow holders,
    two first sprockets each rotatably connected on both of two opposed sides of the drive shaft respectively,
    four second sprockets each rotatably connected on both of two opposed sides of the two driven shafts individually so that the two bendable chains are inserted through the pair of hollow holders to mesh with the two first sprockets and the four second sprockets respectively;
    two first auxiliary gears each disposed beside a respective one of the two first sprockets individually,
    four second auxiliary gears each mounted beside a respective one of the four second sprockets respectively, and
    an intermediate gear rotatably connected between any two adjacent of the two first auxiliary gears and the four second auxiliary gears, such that the drive shaft drives the two first sprockets and the four second sprockets to revolve, and the two first sprockets and the four second sprockets actuate at least one kneading element on the drive shaft or the two driven shafts to rotate.

* * * * *